(12) United States Patent
Audouin et al.

(10) Patent No.: US 7,769,533 B2
(45) Date of Patent: Aug. 3, 2010

(54) SYSTEM FOR DETERMINING THE LEVEL OF SULPHUR POISONING OF DEPOLLUTION MEANS INTEGRATED INTO THE EXHAUST LINE OF A MOTOR VEHICLE ENGINE

(75) Inventors: Arnaud Audouin, Paris (FR); Benoit Frouvelle, Paris (FR)

(73) Assignee: Peugeot Citron Automobiles SA, Velizy Villacoublay (FR)

( * ) Notice: Subject to any disclaimer, the term of this patent is extended or adjusted under 35 U.S.C. 154(b) by 50 days.

(21) Appl. No.: 12/095,561

(22) PCT Filed: Nov. 22, 2006

(86) PCT No.: PCT/FR2006/051210
§ 371 (c)(1),
(2), (4) Date: Sep. 3, 2008

(87) PCT Pub. No.: WO2007/063235
PCT Pub. Date: Jun. 7, 2007

(65) Prior Publication Data
US 2009/0171553 A1    Jul. 2, 2009

(30) Foreign Application Priority Data
Dec. 1, 2005    (FR) .................................. 0512222

(51) Int. Cl.
*G06G 7/70* (2006.01)
*F01N 11/00* (2006.01)
*F02D 41/02* (2006.01)
*F01N 3/20* (2006.01)

(52) U.S. Cl. ............................ 701/108; 60/276; 60/285
(58) Field of Classification Search ................. 701/108, 701/109, 102; 60/276, 285, 301, 297; 436/111, 436/114, 119, 120
See application file for complete search history.

(56) References Cited

U.S. PATENT DOCUMENTS

| | | | |
|---|---|---|---|
| 5,832,722 A | 11/1998 | Cullen et al. | |
| 6,199,374 B1 | 3/2001 | Hirota et al. | |
| 6,293,094 B1 * | 9/2001 | Schmidt et al. | ............... 60/284 |
| 6,484,493 B2 * | 11/2002 | Takanohashi | ................ 60/277 |

(Continued)

FOREIGN PATENT DOCUMENTS

EP    0869263 A1    10/1998

(Continued)

OTHER PUBLICATIONS

International Search Report mailed Apr. 24, 2007 in PCT/FR2006/051210.

*Primary Examiner*—Hieu T Vo
(74) *Attorney, Agent, or Firm*—Nicolas E. Seckel

(57) ABSTRACT

A system for determining the level of sulphur poisoning of a depollution device integrated into the exhaust line of a motor vehicle engine involves controlling the operation thereof, switching the system between a lean storage mode and a rich storage mode, calculating the sulphur storage speed in the lean mode, calculating the sulphur elimination speed in the rich mode, calculating the quantity of sulphur stored in the depollution device during the operation of the engine and comparing the quantity of sulphur with threshold values for determining a poisoning level of the depollution device.

6 Claims, 7 Drawing Sheets

U.S. PATENT DOCUMENTS

| | | | |
|---|---|---|---|
| 6,341,487 B1 | 1/2004 | Takahashi et al. | |
| 7,514,264 B2 * | 4/2009 | Ceccarini et al. | 436/119 |
| 2006/0258013 A1 | 11/2006 | Ceccarini et al. | |

FOREIGN PATENT DOCUMENTS

| | | | |
|---|---|---|---|
| EP | 0911499 A2 | 4/1999 | |
| EP | 1041263 A2 | 10/2000 | |
| EP | 1324037 A | 7/2003 | |
| EP | 1471219 A1 | 10/2004 | |
| FR | 2838479 A | 10/2003 | |
| JP | 2003-129830 A | * | 5/2003 |

* cited by examiner

SYSTEM FOR DETERMINING THE LEVEL OF SULPHUR POISONING OF DEPOLLUTION MEANS INTEGRATED INTO THE EXHAUST LINE OF A MOTOR VEHICLE ENGINE

The present invention concerns a system for determining the level of sulfur poisoning in pollution control means integrated into a motor vehicle engine exhaust line.

More specifically, the invention relates to such a system in which the engine is associated with means for controlling its operation to switch the engine between lean mode operation, in which sulfur is stored, and rich mode operation, in which sulfur is released.

Such a gas post-treatment system, e.g., of the NOx trap type, is a sequential system that operates in a mode in which the NOx released by the engine is stored in the trap in lean mode, i.e., in normal operation of the diesel engine, for example, and in a mode in which the NOx stored in the trap is released and reduced in rich mode.

During the lean phases, i.e., the NOx trapping phases, the sulfates ($SO_2$, $SO_3$) released in small amounts by the engine are stored in the trap in the same storage sites as the NOx. Unlike the nitrates, the sulfates are not released during DeNOx operations in rich mode. This results in the trap being slowly poisoned by sulfur.

This sulfur poisoning is problematic, since it progressively reduces the performance of the NOx trap, meaning that NOx conversion drops. That is, since the sulfates are stored at the same sites as the NOx, a reduction in the storage capacity of the trap is observed as sulfur poisoning of the trap increases over time.

However, it is possible to release the sulfur present in the NOx trap. In order to do this, it is necessary to change over to rich mode at high temperatures. That is, a rich exhaust gas atmosphere alone cannot purge sulfates; one must also provide a high enough temperature, e.g., at least 700° C.

The difficulty, then, is in providing the temperature that is necessary and sufficient to desulfurize the trap. Actually, the high heat levels that enable the release of sulfur result in thermal aging of the NOx trap. High temperatures progressively degrade the properties of the storage materials, the precious metals and the support.

Thus it is paramount that the activation and duration of desulfurization be set appropriately.

The purpose of the invention is to propose a system that makes it possible to determine this sulfur mass stored in the trap, and thus the level of poisoning thereof, in a continuous manner.

To this end, an object of the invention is a system for determining the level of sulfur poisoning in pollution control means integrated into an exhaust line of a motor vehicle engine associated with means for controlling its operation to switch the engine between operating in lean mode for storage and rich mode for release, characterized in that it has means for calculating the sulfur storage rate in lean mode, means for calculating the sulfur release rate in rich mode, means for calculating the quantity of sulfur stored in the pollution control means while the engine is operating, and means for comparing this quantity of sulfur to threshold values so as to determine a level of poisoning in the pollution control means.

According to other characteristics of the invention:

the sulfur storage rate is calculated from a first storage rate for the sulfur coming from the fuel consumed by the engine and a second storage rate for the sulfur coming from the lubricating oil consumed by the engine;

the first rate is determined by the relation:

$$Q\text{carb}(g/s)=(0.835/3\cdot10^4)*(Q\text{pilot}_1+Q\text{main}_1+Q\text{post}_1(mm3/cp))*N_1(rpm)$$

where:

Qpilot, Qmain, Qpost represent consumption rates during the various fuel injections to the engine, and N represents the engine rotation speed;

the second rate is calculated from the relation:

Oil sulfur content [ppm]*Oil cons [g/1000 km]/ 1000*Vehicle speed [km/h]/3600;

the sulfur release rate in rich mode is determined by the relation V deSOx=f ($\lambda_{upstream}$, TdeNOx)

where $\lambda_{upstream}$ represents the exhaust gas oxygen content upstream of the pollution control means, provided by corresponding measuring means, and TdeNOx represents the temperature thereof;

the quantity of sulfur thus determined is compared to four preset thresholds for establishing five levels of poisoning: low, medium, high, very high and critical; and the poisoning level is sent to a deSOx supervisor linked to a deSOx controller adapted to implement desulfurization by sequencing lean- and rich-mode engine operating phases.

The invention will be more easily understood in the following description, given only as an example, and written with reference to the annexed drawings, in which:

FIG. 1 illustrates an exhaust line, designated by general reference 1, integrated into the exit of a motor vehicle engine, e.g., a diesel engine, designated by general reference 2.

Figure 1:
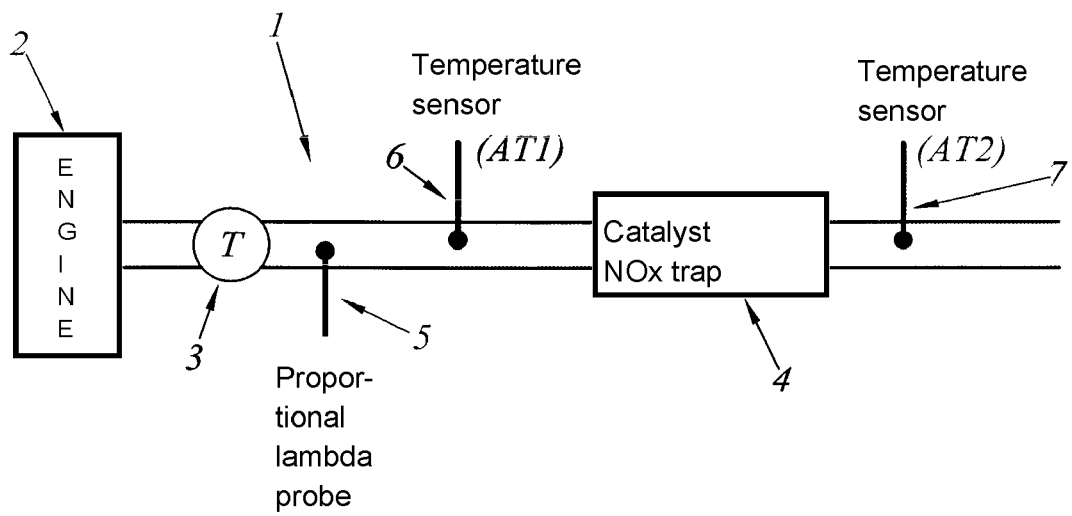
FIG. 1 shows a block diagram illustrating the layout of an exhaust line from an engine output.

A turbocompressor designated by general reference 3 can also be associated with the exit of this engine.

The exhaust line has pollution control means designated by general reference 4, comprising a NOx trap catalyst, for example.

Various sensors are also associated with this exhaust line.

For example, a proportional λ probe designated by general reference 5 can be provided upstream of the pollution control means 4, as well as two temperature probes, one called AT1, designated by general reference 6, and the other AT2 designated by general reference 7, placed on either side of this pollution control means 4.

As previously mentioned, sulfur poisoning of the pollution control means creates a problem because it results in a progressive decrease in the performance of the NOx trap, i.e., a drop in NOx conversion.

Figure 2:
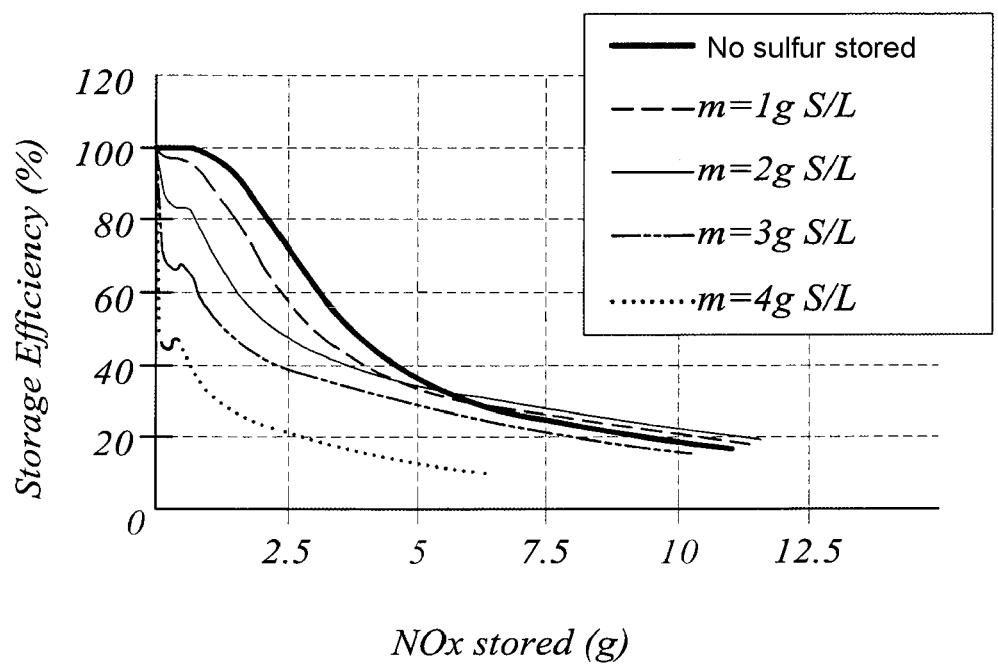
FIG. 2 shows the change in storage capacity over time at multiple levels of sulfur poisoning in the pollution control means.

This is illustrated in FIG. 2, for example, which shows the change over time in storage capacity at multiple sulfur poisoning levels.

Figure 3:
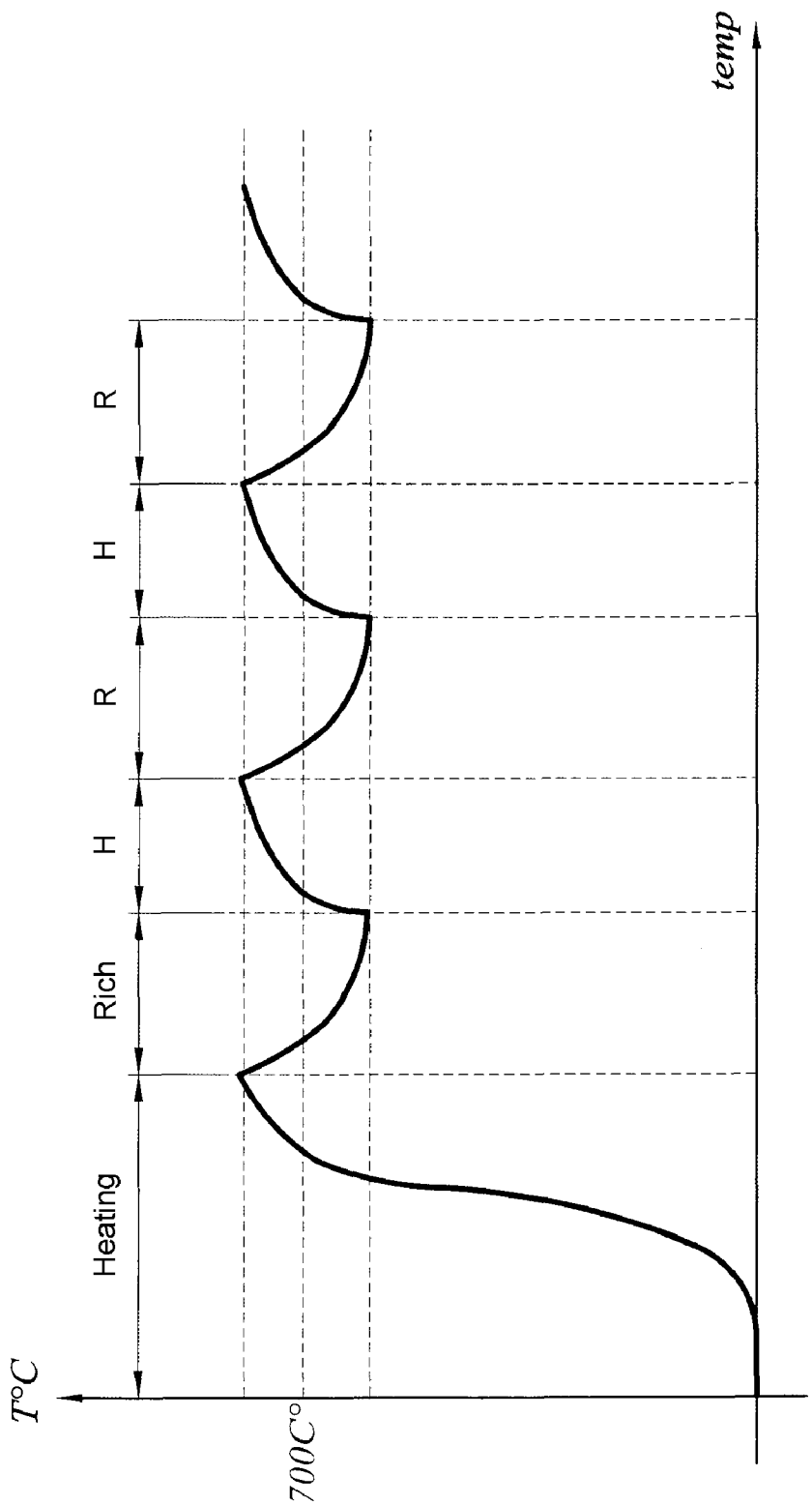
FIG. 3 illustrates the principle of a desulfurization process for such a pollution control means.

FIG. 3 illustrates the operating principle of the desulfurization phases of such pollution control means.

In fact, the exhaust gas temperatures of a diesel engine, for example, which are between 150° C. and 500° C., are well below the temperatures needed to desulfurize the NOx trap, which are around 700° C.

Specific heat calibrations for the exhaust gases have been developed, for example, using fuel post-injections during the combustion strokes of the cylinders of the engine, making it possible to achieve these temperature levels.

A rich calibration has also been developed for releasing the NOx and the sulfates, as illustrated in this FIG. 3.

Actually, this figure shows the various desulfurization phases:

performing heat calibration until the heat level is sufficient;
changing over to rich mode to release the sulfates; and
possibly adjusting the temperature by returning to heat mode.

The difficulty with such an operation lies in controlling the temperature in dynamic vehicle conditions. In particular, driver demands—i.e., accelerating, releasing the gas pedal, etc.—have a significant impact on these heat levels.

Another difficulty relates to emissions of $H_2S$, a toxic, highly odorous pollutant. It has been established that these emissions can be reduced by returning regularly to lean mode, i.e., excess oxygen mode. Consequently, rich mode phases must not exceed a predefined time limit enabling $H_2S$ emissions reduction.

The determination system according to the invention is employed in the general context of means for controlling operation of the vehicle engine. The system according to the invention relates to calculating the sulfur mass present in the NOx trap catalyst. This sulfur mass then becomes a factor in a deSOx supervisor's decision to initiate, or conversely, to terminate, a desulfurization phase.

In fact, such a model is integrated into the engine control means, and it estimates the sulfur mass at each instant, this sulfur mass being converted to a poisoning level that is transmitted to the deSOx supervisor that controls the decision to initiate a desulfurization phase. This decision is then transmitted to a deSOx controller in charge of performing desulfurization by sequencing heating and rich phases.

Figure 4:
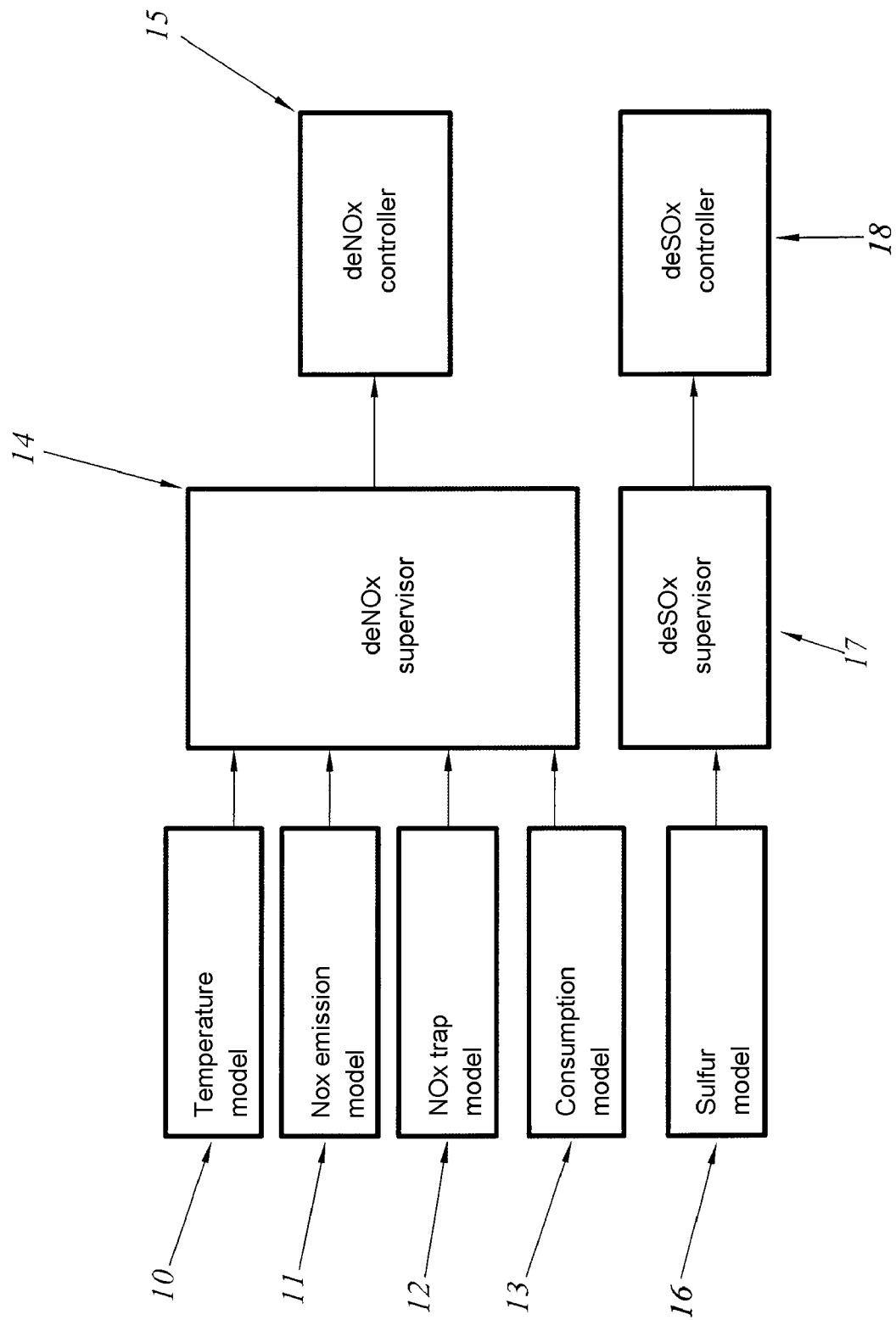
FIG. 4 shows a block diagram of the means for controlling an engine.

FIG. 4 illustrates the general structure of such control means.

Actually, such means comprise means forming a temperature model, designated by general reference 10 in this figure, means forming a NOx emissions model, designated by general reference 11, means forming a NOx trap model, designated by general reference 12, and means forming a consumption model, designated by general reference 13. These various models are linked to a deNOx supervisor, designated by general reference 14, which is itself linked to a deNOx controller, designated by general reference 15.

The model forming a sulfur poisoning level estimator for the trap is designated by general reference 16, and is connected to a deSOx supervisor, designated by general reference 17, which is itself linked to a deSOx controller, designated by general reference 18.

The sulfur mass is continuously calculated. To this end, two different calculations are performed. That is, one of these calculations pertains to the sulfur storage rate, and the other pertains to the sulfur release rate. According to whether deSOx is off or on, a switch takes one of the two rates for integration in order to estimate the sulfur mass in the trap continuously.

Figure 5:
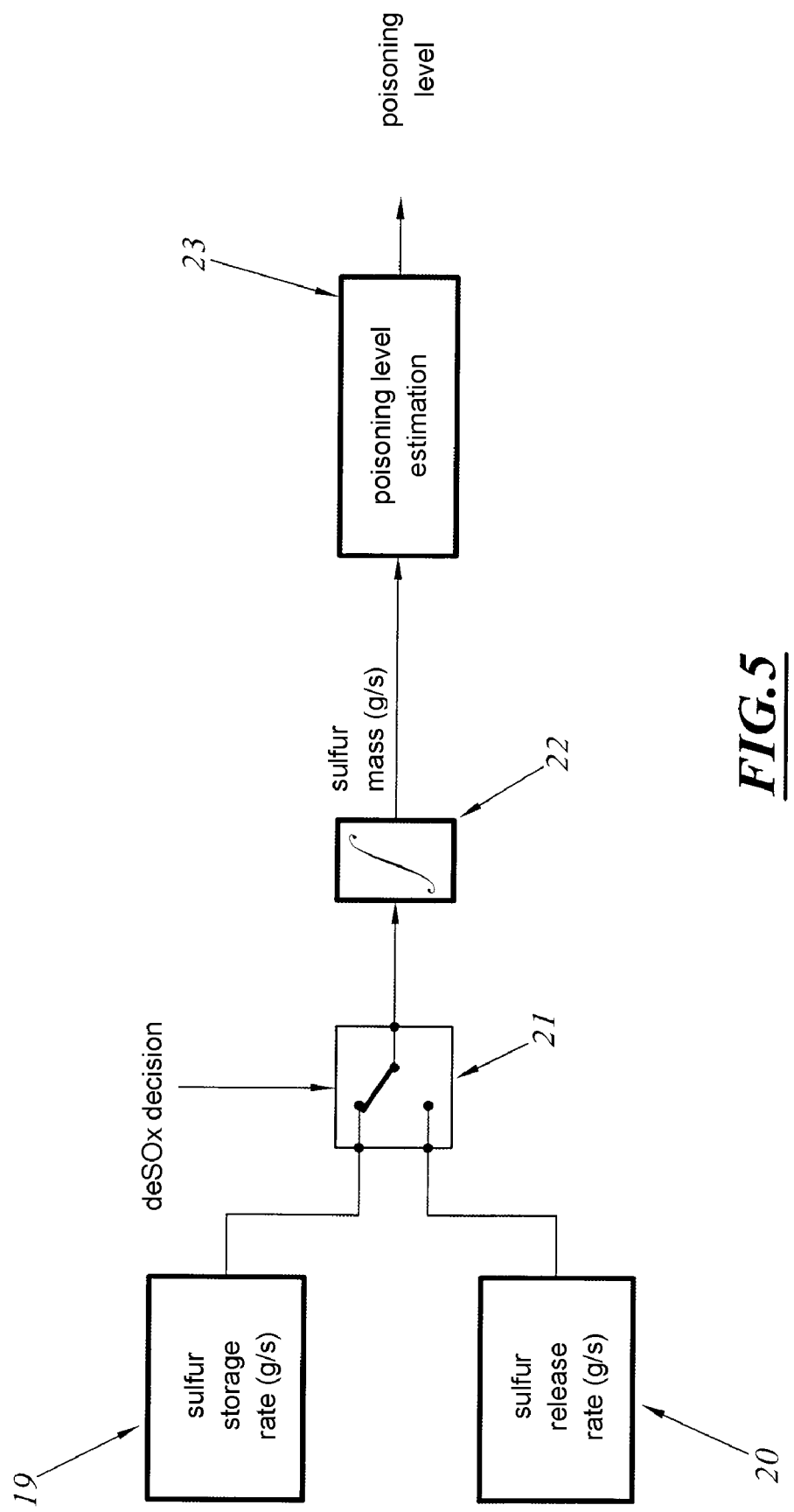
FIG. 5 shows a block diagram illustrating the general structure of a determination system according to the invention.

For example, this is illustrated in FIG. 5, where we see that sulfur storage rate and sulfur release rate estimators 19 and 20, respectively, are associated with a switch 21 that switches between one or the other of the outputs of these calculation modules 19 and 20, according to whether deSOx is on or off. Reference 22 illustrates the integrator from which the sulfur mass present is obtained, which is then provided to a poisoning level estimator 23 so as to provide a poisoning level information unit.

The sulfur storage rate calculation is in fact the sum of two storage rates, i.e., the rate due to the sulfur contained in the fuel consumed by the engine, and the rate due to the sulfur contained in the lubrication oil consumed by the engine.

The storage rate for sulfur coming from the fuel consumed by the engine is calculated assuming that the fuel sulfur content is constant, i.e., at 10 ppm, for example. The instantaneous fuel consumption by the engine (Qcarb) is determined by adding together the flow rates of the various injections being used, namely the pilot (Qpilot), main (Qmain) and post-injections (Qpost), according to the relation:

$$Q\mathrm{carb}(g/s) = (0.835/3 \cdot 10^4) * (Q\mathrm{pilot}_1 + Q\mathrm{main}_1 + Q\mathrm{post}_1(\mathrm{mm3/cp})) * N_i(\mathrm{rpm})$$

in which N represents the engine rotation speed.

This instantaneous fuel consumption is then multiplied by the fuel sulfur content, which yields the storage rate thereof.

The storage rate for sulfur coming from the oil consumed by the engine is calculated from the engine oil consumption, which is a value that is calibratable, e.g., in g/1000 km driven, multiplied by the oil sulfur content, which is also a calibratable value.

This storage rate is then determined by the relation:

$$\text{Oil sulfur content [ppm]} * \text{Oil cons [g/1000 km]}/1000 * \text{Vehicle speed [km/h]}/3600.$$

Figure 6:
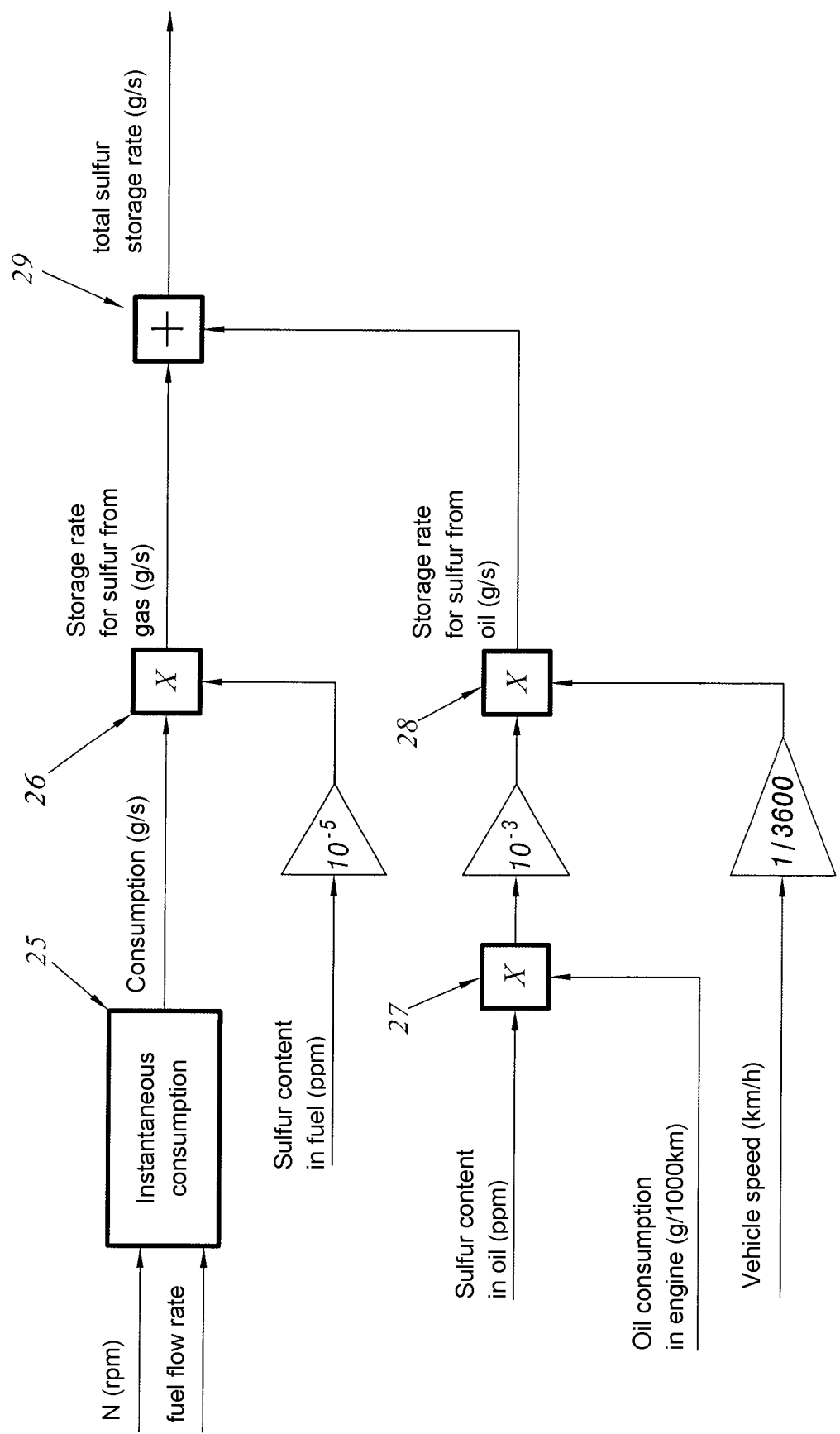
FIG. 6 shows a block diagram illustrating means for calculating the sulfur storage rate.

The total sulfur storage rate is thus the sum of of the rate from fuel and the rate from lubrication oil, as illustrated in FIG. 6.

In this FIG. 6, we see a model for calculating the instantaneous engine fuel consumption, designated by general reference 25, which receives information on the engine rotation speed and fuel flow rate as input. Consumption is then combined with the sulfur content thereof in a multiplier 26 so as to provide information on the storage rate from the fuel consumed.

Calculations using the lubrication oil sulfur content, the engine oil consumption, and the vehicle speed are also performed by multipliers 27 and 28, so as to yield a storage rate for sulfur coming from the lubrication oil consumed by the engine.

These two storage rates are then added together in an adder 29 to yield the total sulfur storage rate.

The release rate, for its part, is calculated in the event that a deSOx decision is sent by the deSOx supervisor. The sulfur mass in the pollution control means decreases each time the engine goes into rich burn mode. Then we use a release model to represent the change over time in the sulfur mass during a deSOx decision.

For this purpose, a sulfur release rate in rich mode $V_{deSOx}$ (g/s) is defined, which is calibratable according to the richness value of the gases as given by the proportional lambda probe at the engine output, designated by general reference 5 in FIG. 1, and the temperature TdeNOx inside the NOx trap catalyst, modeled in the temperature model.

In this way, when DecisionDeSOx=1, the sulfur release rate obeys the following rule:

IF {Decision deSOx=1}
IF $\lambda_{upstream} \geq 1: V_{deSOx} = 0$
ELSE $V_{deSOx} = f(\lambda_{upstream}, \text{TdeNOx})$

OTHERWISE $V_{deSOx}=0$.

Figure 7:
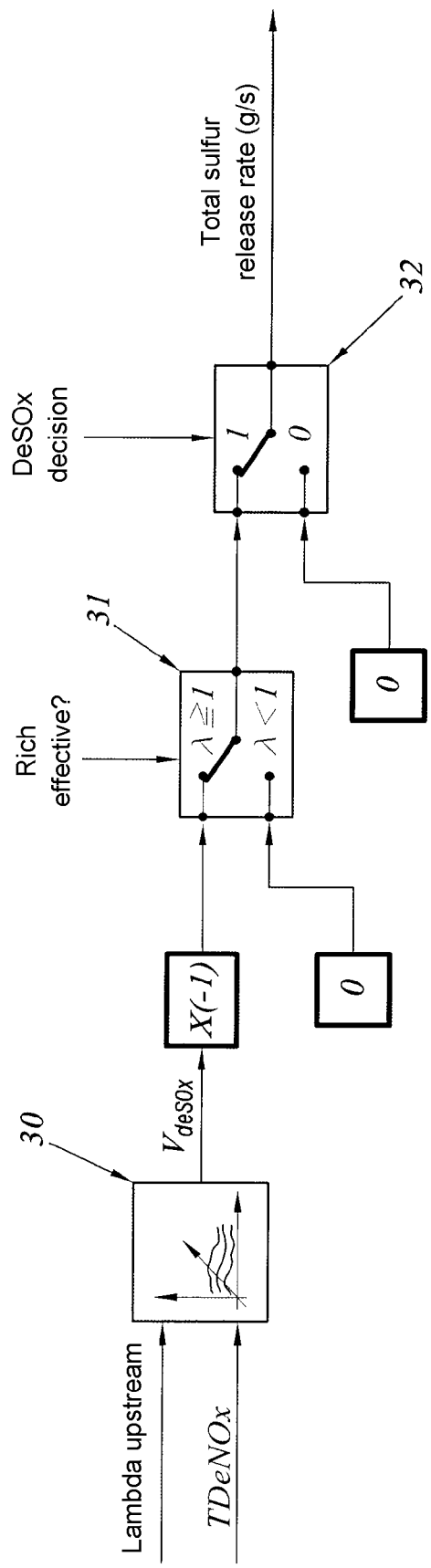
FIG. 7 shows a block diagram illustrating means for calculating the sulfur release rate.

This is illustrated in FIG. 7, where one can see that the sulfur release rate $V_{deSOx}$ is obtained from a chart 30 that receives as input information from the lambda probe and the temperature TdeNOx. The switching modules 31 and 32 make it possible to take the engine operating mode and the decision state into account in order to obtain the sulfur release rate.

Figure 8:
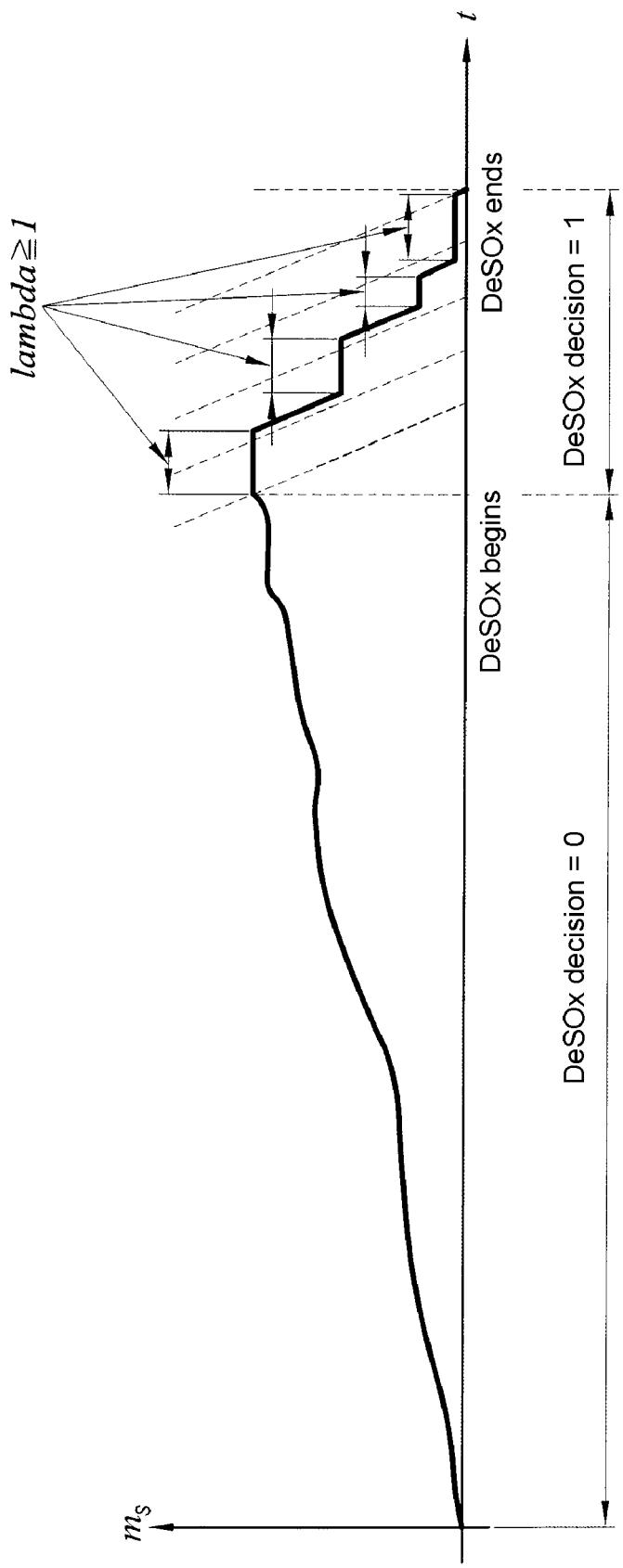
FIG. 8 illustrates the change over time in the sulfur mass in pollution control means.

From these various information units, an integrator then figures in the total storage rate with deSOx off (Decision deSOx=0) or the release rate with deSOx on (Decision deSOx=1). This yields the sulfur mass present in the trap. The change over time in this sulfur mass in the trap is illustrated in FIG. 8.

Next, this quantity of sulfur is compared to various thresholds that are preset, for example, in order to estimate a level of poisoning in the pollution control means.

Thus, for example, this mass can be compared to four predetermined threshold levels for defining five levels of poisoning, namely, a low level, a medium level, a high level, a very high level, and a critical level of poisoning, with the corresponding level being transmitted to the deSOx supervisor and factored into the decision to begin or end a desulfurization phase.

It can be seen that such a system has a certain number of advantages, in particular its simplicity, insofar as the proposed strategy is simple and does not entail a heavy coding requirement.

In addition, there are few values to calibrate, and this type of strategy is integratable into an onboard engine control unit.

Furthermore, such a system is complete insofar as it takes into account all of the processes related to sulfur poisoning of the pollution control means, namely, the stored sulfur originating from the sulfur present both in the fuel consumed by the engine, which has a low content but high consumption, and in the lubricant, which has a high content but low consumption. Also, sulfur is stored only in lean mode and at low temperatures. There is no sulfur storage or release in deSOx heating mode. That is, the temperature is too high for storing sulfur, and the exhaust gases are too lean (high in oxygen) to release sulfur.

Moreover, such a system is also expandable in that the strategy employed assumes a constant sulfur content in the fuel and the lubricant. The calculation is relatively simple and broken down. By changing certain parameters or calibratable values, other constraints can be easily incorporated, namely, for example, an onboard diagnostic function for catalyst performance, using a NOx sensor or a lambda probe downstream of the NOx trap.

Yet other embodiments can be envisioned, of course.

The invention claimed is:

1. System for determining the level of sulfur poisoning in pollution control means integrated into an exhaust line of a motor vehicle engine associated with means for controlling its operation to switch the engine between operating in lean mode for storage and rich mode for release, wherein said system has means for calculating the sulfur storage rate in lean mode, means for calculating the sulfur release rate in rich mode, means for calculating the quantity of sulfur stored in the pollution control means while the engine is operating, and means for comparing this quantity of sulfur to threshold values so as to determine a level of poisoning in the pollution control means, and the sulfur storage rate is calculated from a first storage rate for the sulfur coming from the fuel consumed by the engine and a second storage rate for the sulfur coming from the lubricating oil consumed by the engine.

2. System according to claim 1, wherein the first rate is determined by the relation:

$Q\text{carb}(g/s)=(0.835/3\cdot10^4)*(Q\text{pilot}_1+Q\text{main}_1+Q\text{post}_1(\text{mm3/cp}))*N_i(\text{rpm})$, where:

Qpilot, Qmain, Qpost represent consumption rates during the various fuel injections to the engine, and N represents the engine rotation speed.

3. System according to claim 2, wherein the second rate is calculated from the relation:

Oil sulfur content [ppm]*Oil cons [g/1000 km]/ 1000*Vehicle speed [km/h]/3600.

4. System according to claim 1, wherein the sulfur release rate in rich mode is determined by the relation $V\,deSOx=f(\lambda_{upstream}, TdeNOx)$, where:

$\lambda_{upstream}$ represents the exhaust gas oxygen content upstream of the pollution control means, provided by corresponding measuring means, and TdeNOx represents the temperature thereof.

5. System according to claim 1, wherein the quantity of sulfur thus determined is compared to four preset thresholds for establishing five levels of poisoning: low, medium, high, very high and critical.

6. System according to claim 1, wherein the poisoning level is sent to a deSOx supervisor linked to a deSOx controller adapted to implement desulfurization by sequencing lean- and rich-mode engine operating phases.

* * * * *